Figure 1:
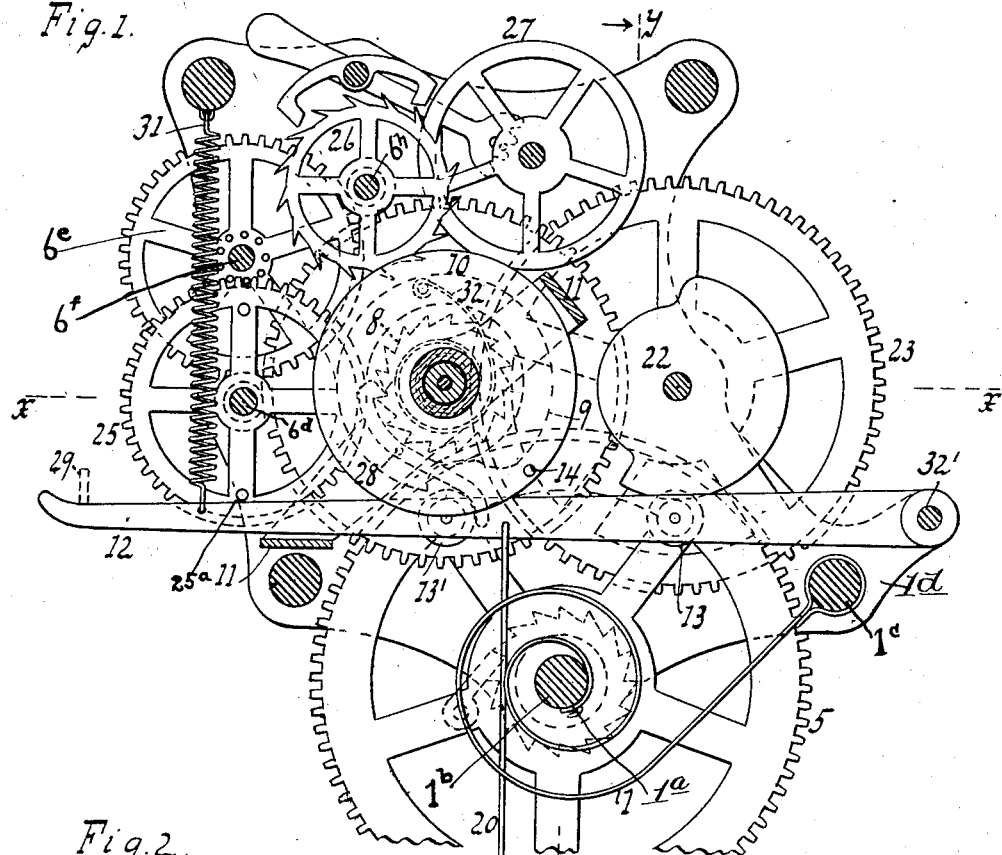

No. 729,193. PATENTED MAY 26, 1903.
W. D. MACDONALD.
CAMERA CONTROLLER.
APPLICATION FILED DEC. 3, 1901.
NO MODEL. 3 SHEETS—SHEET 1.

WITNESSES: INVENTOR
William Miller William D. Macdonald
Chas. E. Pfeuffer BY
W. C. Hauff
ATTORNEY

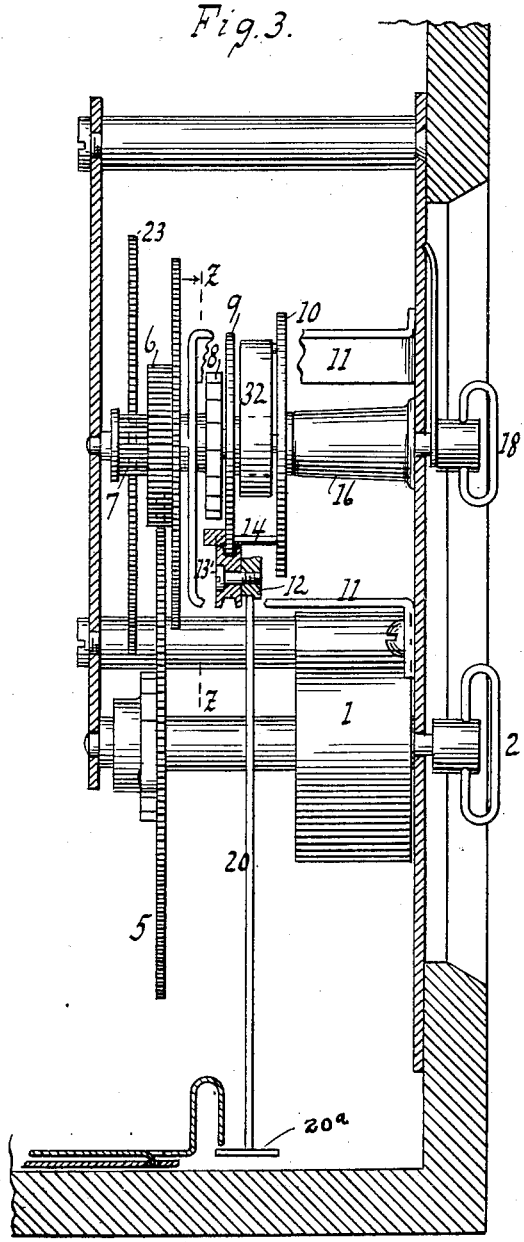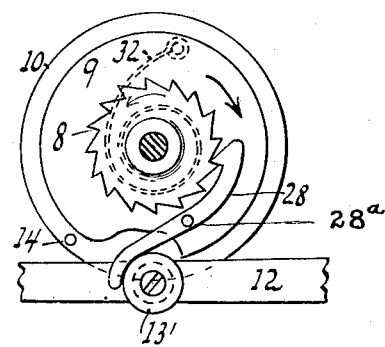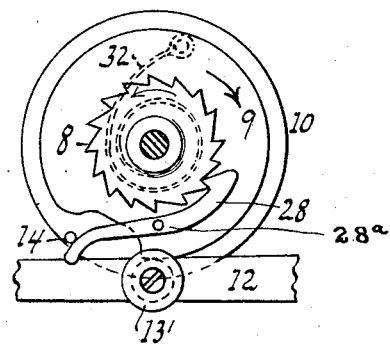

No. 729,193. PATENTED MAY 26, 1903.
W. D. MACDONALD.
CAMERA CONTROLLER.
APPLICATION FILED DEC. 3, 1901.
NO MODEL. 3 SHEETS—SHEET 3.

WITNESSES:
William Miller
Chas. E. P…

INVENTOR
William D. Macdonald
BY
W. C. Hauff
ATTORNEY

No. 729,193. Patented May 26, 1903.

UNITED STATES PATENT OFFICE.

WILLIAM D. MACDONALD, OF NEW YORK, N. Y.

CAMERA-CONTROLLER.

SPECIFICATION forming part of Letters Patent No. 729,193, dated May 26, 1903.

Application filed December 3, 1901. Serial No. 84,559. (No model.)

*To all whom it may concern:*

Be it known that I, WILLIAM D. MACDONALD, a citizen of the United States, residing in Bronx borough, New York city, in the county and State of New York, have invented new and useful Improvements in Camera-Controllers, of which the following is a specification.

This invention relates to a camera-controlling device adapted for controlling an automatic camera when photographing, particularly when the camera is suspended—for example, from a kite or balloon—or under other circumstances when the camera is to be kept out of operation a certain time and to be operated at certain intervals.

The invention further aims to provide a camera-controlling device which is adapted to prevent the camera from operating for a certain period—for example, while the operator is elevating the kite and apparatus—and, further, to operate the camera or trip the exposing-shutter at set intervals.

To this end the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters denote corresponding parts throughout the several views, and in which—

Figure 2:
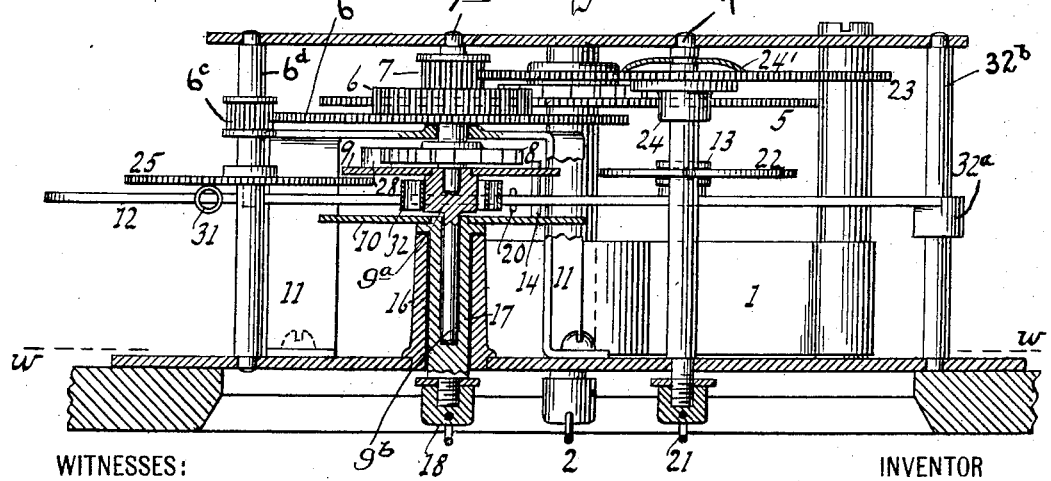
Figure 6:
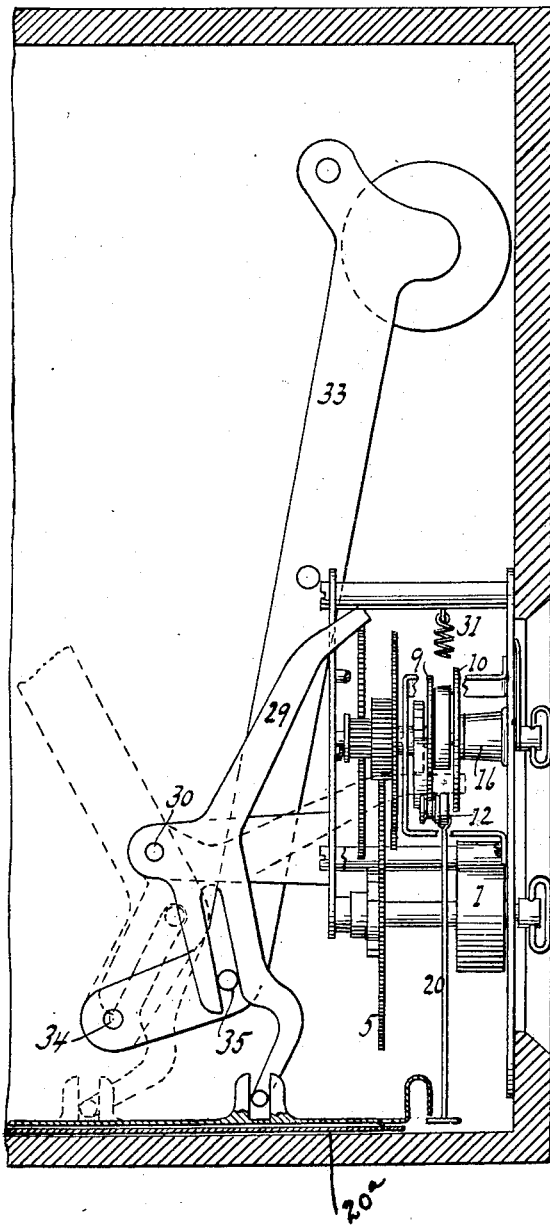
Figure 7:
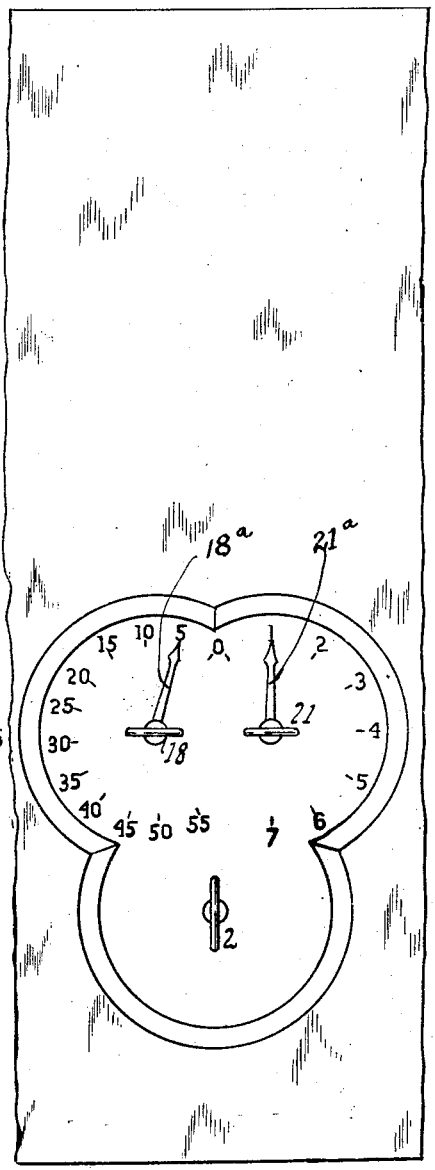

Figure 1 is a face view of the clock-driving mechanism sectioned along line $w\ w$ of Fig. 2. Fig. 2 is a section along the line $x\ x$ of Fig. 1. Fig. 3 is a section along the line $y\ y$ of Fig. 1. Fig. 4 is a section along the line $z\ z$, Fig. 3, showing the pawl of the holding or releasing mechanism in contact with the shutter-actuating lever. Fig. 5 is a view similar to Fig. 4, showing the pawl moved from the lever to the stop. Fig. 6 shows the camera-controller in position in an automatic camera. Fig. 7 shows the dials of the delay and holding mechanisms.

Referring to the drawings by reference characters, the clock-driving mechanism comprises a clock-driving spring 1, connected at one end, as at $1^a$, to the shaft $1^b$ and at its other end to the bar $1^c$, supported by the frame $1^d$. The shaft $1^b$ carries the gear-wheel 5. The spring 1 is adapted to impart motion to the gear-wheel 5.

The reference character 6 denotes a pinion engaged and operated by the gear-wheel 5 and has connected to one face thereof the gear-wheel $6^a$, which engages and drives the pinion $6^c$, carried by the shaft $6^d$, journaled in the frame $1^d$. The shaft $6^d$ carries a gear-wheel 25, which engages with and operates the intermediate gearing $6^e$, mounted upon the shaft $6^f$. This intermediate gearing engages with and actuates the escape-wheel 26, mounted upon the shaft or stud $6^h$. The balance-wheel of the clock-driving mechanism is shown at 27, and the key for winding the clock-driving spring is shown at 2.

The pinion 6 and the gear $6^a$ are mounted upon the shaft $7^a$, which also carries the pinion 7. The latter is adapted to drive the gear-wheel 23, frictionally connected to the shaft $7^b$, journaled in the frame $1^d$. The gear-wheel 23 is frictionally connected to the shaft $7^b$ by means of the spring 24', carried by the shaft $7^b$ and the collar 24. The shaft $7^b$ has fixed thereon the disk 22, provided with a cut-away portion. A setting-handle for the shaft $7^b$ is indicated by the reference character 21. By this arrangement the disk 22 normally moves with the gear-wheel 23, but can be set independently thereof. A dial is provided upon the frame $1^d$ for a pointer $21^a$, carried by the setting-handle 21. By this arrangement the extent of adjustment of the disk 22 can be noted. The dial and pointer $21^a$ are shown in Fig. 7. The manner of adjustment of the disk 22 will be hereinafter referred to. The disk 22 is called the "delay" mechanism or disk, and the shaft $7^b$ and gear 23 are termed the "driving" mechanism for the delay mechanism, and the handle 21 is termed the "delay-mechanism-adjusting means."

The shaft $7^a$ is journaled at one end in one side of the frame $1^d$ and also has a bearing in the frame-piece or bridge 11, suitably supported within the frame $1^d$. The shaft $7^a$ adjacent to the frame-piece or bridge 11 has mounted thereon a ratchet-wheel 8, and that portion of the shaft $7^a$ which projects from the ratchet-wheel 8 extends in the hub $9^a$ of a disk 9, provided with a cut-away portion.

The portion of the shaft 7ᵃ which extends in the hub 9ᵃ of the mutilated disk 9 sits loosely therein, so that the pinion 6 can rotate independently of the disk 9.

The reference character 28 denotes a pawl pivoted, as at 28ᵃ, to the disk 9 and adapted to engage the ratchet-wheel 8, so that as the shaft 7ᵃ is rotated through the medium of the pinion 6 the pawl 28 will engage with the ratchet-wheel 8 and impart motion to the disk 9. The pawl 28 is an elongated one and pivoted approximately at its center, the lower end of the pawl being of such length as to project a suitable distance beyond the disk 9, the function of which will be hereinafter referred to.

The reference character 32 denotes a coil returning-spring, which is attached at one end to the disk 9 and at its other end connected to a disk 10, mounted upon the tubular shaft 17, into which projects the axle or spindle 9ᵇ of the disk 9. The tubular shaft 17 of the disk 10 does not rotate with the disk 9, and is set by means of the handle 18, which is provided with the pointer 18ᵃ, and upon the frame 1ᵈ is arranged a dial for the pointer 18ᵃ.

The reference character 16 denotes a tube supported in one side of the frame 1ᵈ for forming a bearing for the tubular shaft 17. The disk 10 is not connected or geared to the clock-driving mechanism and is not moved thereby, but will stay in any position to which it is set—say, for example, at "5," "10," or any other number.

The disk 10 carries a pin or stop 14, Figs. 1 and 2, for the projecting end of the pawl 28. In Fig. 5 the projecting end of the pawl is shown resting against the pin 14, and thus limiting the return or back rotation of disk 9 under the influence of spring 32. At the same time the pressure of the projecting end of the pawl against stop 14 causes the pawl 28 to swing to engagement with the ratchet-wheel and so that said pawl and disk 9 will be started rotating forward by the ratchet-wheel 8, which moves continuously with the clock-driving mechanism. The disk 9 is termed the "holding-disk." The ratchet-wheel 8, pinion 6, and pawl 28 are termed the driving mechanism for the holding-disk. The disk 10 and stop 14 are termed the releasing mechanism as well as an adjustable stop for the driving mechanism of the holding mechanism. The handle 18 and pointer 18ᵃ are termed the adjusting mechanism for the releasing mechanism of the holding mechanism.

The reference character 12 denotes an actuating-lever which is fulcrumed, as at 32ᵃ, to the bar 32ᵇ, mounted in the frame 1ᵈ. The lever 12 is provided with a pair of roller-studs 13 and 13', which are arranged below the disks 22 and 9.

The reference character 31 denotes a spring, which is connected at its upper end to the frame 1ᵈ and at its lower end to the forward part of the lever 12. This spring 31 tends to elevate the lever 12, so the roller-studs 13 and 13' will be moved upward and engage the disks 22 and 9. During the time that the high or unmutilated parts of the disks 22 and 9 are in engagement with the rollers 13 and 13', as shown in Figs. 1 and 5, the spring 31 tends to hold the lever 12 stationary against the disk. When, however, the cut-away portion of the disks 22 and 9 is opposite the rollers 13 and 13', the spring 31 will cause the lever or its rollers 13 and 13' to be moved into the said cut-away portions of and against the disks 22 and 9. The disk 22 has a larger cut-away portion than that of the disk 9, so that the disk 22 will for a considerable period—say several hours—leave the lever 12 free to be moved by the spring 31. When the roller 13' moves in the cut-away portion or recess of the disk 9, the spring 31 assists in this movement—that is to say, when the cut-away portion of the disk 9 comes to the roller 13' the spring 31 moves the lever 12 and causes the roller 13' to move into said recess or cut-away portion of the disk 9 and engage the projecting end of the pawl 28 and move the same to disengage the upper end of the pawl 28 from the ratchet-wheel 8. This permits the disk 9 to be returned or rotated backward by means of the spring 32 as soon as the lever 12 is moved to force or swing the roller 13' out of the cut or recess in the disk 9. The gear-wheel 25 is provided with studs or pins 25ᵃ, which are adapted to engage with the lever 12 to move the same, so as to force the roller 13' out of the cut-away portion or recess in the disk 9 and permit the latter to be rotated backward or returned to its normal position by means of the spring 32.

The oscillations of the lever 12 in the manner as hereinbefore set forth can by means of a suitable connection 20 be made to actuate the shutter or slide 20ᵃ of a camera. The disk 10 and stops 14 can also be called a time-interval mechanism as well as the releasing mechanism for the driving mechanism of the holding-disk, since by setting the disk by means of the handle 18 so that the stop 14 arrests the disk 9 at one point or another the pawl 28 in its return can be made to skip one or more teeth of the ratchet-wheel 8 before the projecting end of the pawl 28 comes onto the stop 14 and the upper end of the pawl is moved or pressed back to engagement or reëngagement with the ratchet.

The return of disk 9, as above set forth, occurs when the disk 9 is freed by one of the studs 25ᵃ of the wheel 25 having moved lever 12 and lifted roller 13' out of the cut-away portion or recess in the disk 9, and such return of the disk 9 also springs the high or holding parts of the disk 9 to engage with roller 13' and again hold the lever 12 out of action.

The wheel 25 by its studs or pins 25ᵃ pressing back the lever 12 against the action of spring 31 could be used for actuating said lever without the interposition of the disk 9;

but as this wheel 25 forms a part of the clock-driving mechanism and moves at uniform speed adjustment would in such cases be impossible. The disk 9, on the other hand, as just explained, enables such adjustment, so that the actuation of lever 12 occurs at suitable intervals, such as once for every certain number of minutes. While the high part of disk 9 thus holds the stud 13' and lever 12 against the action of spring 31, the wheel 25 rotates idly, so far as the actuating-lever 12 is concerned. When lever 12, however, has moved its roller 13' into the cut-away portion or recess of the disk 9, said wheel 25, by one of its pins or studs 25ª, forms a releasing mechanism for the actuating-lever to force roller 13' out of the cut-away portion of disk 9. The disk 9, or rather its unmutilated portion, when arresting the roller 13' forms a holding mechanism for keeping the lever 12 from being moved by the spring 31. Therefore this disk 9 is termed the "holding-disk."

Although the disk 22 and the roller 13 impart a movement to lever 12, still these parts are not alone sufficient to operate the camera periodically, as required, since if disk 22 rotates rapidly, as required for periodical exposures, the disk 22 would start the camera operating before it is adjusted in place or up in the air. If, on the other hand, the disk 22 rotates slowly, as it does, then such disk would operate the camera-shutter about once at an interval of several hours, which manifestly is not what is sought for.

The adjustment of the disk 22 is as follows: The shaft 7ª is turned by means of the handle, so that the pointer 21ª will be moved from the letter "O" to the right in Fig. 7, so as to come, for example, to the number "4," consequently moving a corresponding part of the high portion of the disk 22 to contact with the roller 13 on lever 12. Then as the clock mechanism keeps on running it would take four hours to bring the disk 22, with the pointer 21ª, back to the letter "O" and the low part of the disk 22 back to roller 13. This disk thus forms a delay mechanism for holding the lever 12 out of action for a predetermined period—say one or more hours—to give the operator time for preparation, such as the running of the kite or balloon. Therefore the disk 22 is termed the "delay-disk."

In Fig. 6 is shown how the mechanism of the automatic camera can be used to lift the lever 12, Fig. 1, out of the cut-away portion of disk 9 when preferable instead of the pins in wheel 25. The lever 29, which is fulcrumed at 30, forms part of the automatic camera and moves into contact with lever 12 and away again while the automatic camera is in action.

Having thus fully described my invention, what I claim as new, and desire to secure by Letters Patent, is—

1. In a camera-controlling mechanism, the combination of a shutter-actuating lever, a delay and a holding mechanism suitably engaging therewith, a releasable driving mechanism for the holding mechanism, and an adjustable stop for varying the return movement of the holding mechanism.

2. In a camera-controlling mechanism, the combination of a shutter-actuating lever, a delay and a holding disk provided with an engaging and a releasing portion suitably contacting with the said lever, a driving mechanism for the holding-disk adapted to be released by said lever to permit of the return of the holding-disk, and a stop for limiting the return movement of said holding-disk.

3. In a camera-controlling mechanism, the combination of a shutter-actuating lever, a delay-disk and a holding-disk, each having an engaging and a releasing portion suitably contacting with the said lever, a pawl for imparting movement to the said holding-disk, driving means for the said pawl, and a stop for the said pawl, and means carried by the lever and engaging with the pawl for disconnecting it from its driving means.

4. In a camera-controlling mechanism, a shutter-actuating lever, a delay-disk and a holding-disk suitably engaging therewith, a pawl for imparting movement to said holding-disk, driving means engaging the said pawl, a spring for returning the said holding-disk to its normal position, means for releasing the pawl from its engagement with the driving mechanism, and an adjustable stop for limiting the return movement of the holding-disk.

5. In a camera-controlling mechanism, a shutter-actuating lever, a delay-disk and a holding-disk suitably engaging with said lever, a pawl for imparting movement to said holding-disk, driving means for said pawl, means for releasing the said pawl from its driving means, a spring having one end connected to said holding-disk for returning it to its normal position, and a stop for limiting the return movement of said disk suitably connected to the other end of said spring.

6. In a camera-controlling device, the combination of a clock-driving mechanism, a delay and a holding disk operated by the said mechanism, a shutter-actuating lever suitably engaged by the said disks, and means for adjusting the said disks independently of the movement of the mechanism.

7. In a camera-controlling device, a clock-driving mechanism, a delay and a holding disk operated thereby, a shutter-actuating lever suitably engaged by the said disks, means for turning the holding-disk to its normal position, a stop for limiting the return movement of the said holding-disk, and means for adjusting the said stop independent of the said mechanism.

8. In a camera-controlling device, a clock-driving mechanism, a delay and a holding disk actuated by the said mechanism, a shutter-actuating lever engaged by the said disks, and an adjustable stop for the holding-disk.

9. In a camera-controlling device, a clock-driving mechanism, a delay-disk actuated by said mechanism, means for adjusting the said delay-disk independently of the said mechanism, a holding-disk, means for connecting the holding-disk with the said mechanism to cause its operation, means for releasing the holding-disk from its connection with said mechanism, means for returning the holding-disk to its normal position, and adjustable means for arresting the return movement of the said holding-disk.

10. In a camera-controlling device, the combination of a delay-disk and a holding-disk, operating means therefor, a shutter-actuating lever suitably engaged by said disks, and means for moving the lever from its engagement with said disks.

11. In a camera-controlling device, a shutter-actuating lever engaging therewith, and a delay and holding disk suitably engaging with the actuating-lever, for the purpose set forth.

12. In a camera-controlling device, a shutter-actuating lever, a releasable driving mechanism for the shutter-actuator, and a stop for arresting the return of the release driving mechanism, said stop being adjustable for varying the return movement of the shutter-actuator.

13. In a camera-controlling device, a delay-disk, operating means therefor, means for adjusting said disk independently of the operating mechanism, a holding-disk, a releasable driving mechanism therefor, means for turning said holding-disk to its normal position, an adjustable mechanism for limiting the return movement of said holding-disk, and a shutter-actuating lever suitably engaged by the said disk, for the purpose set forth.

14. In a camera-controlling device, a clock-driving mechanism, a delay-disk operated thereby, means for adjusting said delay-disk independently of the said mechanism, a holding-disk, means for connecting the holding-disk to said mechanism to cause the operation of said disk, means for releasing said holding-disk from its engagement with said mechanism, means for returning said holding-disk to its normal position, means for varying the return movement of said holding-disk, a shutter-actuating lever adapted to engage with the said disks, and means for moving the said lever from its engagement with the said disks.

In testimony whereof I have hereunto set my hand in the presence of two subscribing witnesses.

WILLIAM D. MACDONALD.

Witnesses:
CHAS. E. POENSGEN,
E. F. KASTENHUBER.